US010392589B2

(12) United States Patent
Mertens

(10) Patent No.: US 10,392,589 B2
(45) Date of Patent: Aug. 27, 2019

(54) METHOD FOR EXTRACTION AND DISSOLUTION OF HOP ACIDS IN AQUEOUS MEDIA

(71) Applicant: IFAST NV, Roosdaal (BE)

(72) Inventor: Pascal Mertens, Roosdaal (BE)

(73) Assignee: IFAST NV, Roosdaal (BE)

( * ) Notice: Subject to any disclaimer, the term of this patent is extended or adjusted under 35 U.S.C. 154(b) by 393 days.

(21) Appl. No.: 15/030,933

(22) PCT Filed: Oct. 21, 2014

(86) PCT No.: PCT/EP2014/072559
§ 371 (c)(1),
(2) Date: Apr. 21, 2016

(87) PCT Pub. No.: WO2015/059148
PCT Pub. Date: Apr. 30, 2015

(65) Prior Publication Data
US 2016/0264916 A1 Sep. 15, 2016

(30) Foreign Application Priority Data
Oct. 21, 2013 (GB) .................................. 1318568.1

(51) Int. Cl.
C12C 3/08 (2006.01)
C12C 7/24 (2006.01)
C12C 11/11 (2019.01)

(52) U.S. Cl.
CPC ............... C12C 3/08 (2013.01); C12C 7/24 (2013.01); C12C 11/11 (2013.01)

(58) Field of Classification Search
CPC ...... C12C 3/00; C12C 3/06; C12C 3/08; C12C 3/085; C12C 3/10; C12C 3/12; C12C 7/20; C12C 7/205; C12C 7/287; C12C 9/00; C12C 9/02; C12C 9/025
USPC .................................................. 426/600, 592
See application file for complete search history.

(56) References Cited

U.S. PATENT DOCUMENTS

| 3,956,513 A | 5/1976 | Clarke et al. |
| 5,155,276 A | 10/1992 | Paul |
| 2003/0138546 A1 | 7/2003 | Goldstein et al. |
| 2011/0288335 A1 | 11/2011 | Ting et al. |
| 2013/0209653 A1* | 8/2013 | De Vos ..................... C12C 3/12 426/600 |

FOREIGN PATENT DOCUMENTS

| CN | 103180428 A | 8/2013 |
| WO | 2012041994 A1 | 4/2012 |

OTHER PUBLICATIONS

Patrick Lu-Ping, "Preparation and Purification of Hop Acids and Their Derivatives," 1996 American Society of Brewing Chemists, Inc., Publication No. J-1996-0319-01R, pp. 103-109.
International Search Report, dated Aug. 21, 2015, issued in PCT/EP2014/072559.

* cited by examiner

Primary Examiner — Vera Stulii
(74) Attorney, Agent, or Firm — Gianna J. Arnold; Saul Ewing Arnstein & Lehr LLP

(57) ABSTRACT

The invention relates to a method for extraction into an aqueous medium of hop acids from a hop acids containing matter and for dissolution in an aqueous medium of hop acids, comprising contacting a hop acids containing matter with carbon-containing chemical substances having at least one functional group containing a nitrogen atom with a lone electron pair and at least one other polar and/or hydrophilic functional group, thereby forming complexes of hop acids with the carbon-containing chemical substances with at least one functional group containing a nitrogen atom with a lone electron pair and at least one other polar and/or hydrophilic functional group. The present invention further relates to a method for preparing a brewed beverage, particularly for brewing a beer, and in particular to a method to improve the utilization of hop acids, including alpha-acids and iso-alpha-acids, in the brewing process.

10 Claims, No Drawings

METHOD FOR EXTRACTION AND DISSOLUTION OF HOP ACIDS IN AQUEOUS MEDIA

FIELD OF THE INVENTION

The present invention relates to a method for extraction and dissolution of hop acids, including alpha-acids (and derivatives), iso-alpha-acids (and derivatives, such as reduced iso-alpha-acids) and beta-acids (and derivatives), in (acidic) aqueous media.

The present invention further relates to a method for preparing a brewed beverage, particularly for brewing a beer, and in particular to a method to improve the utilization of hop acids, including alpha-acids and (reduced) iso-alpha-acids, in the brewing process.

BACKGROUND OF THE INVENTION

Hop acids, such as alpha-acids (principal analogues are humulone, cohumulone and adhumulone; also collectively named humulones), iso-alpha-acids (principal analogues are the cis- and trans-isomers of isohumulone, isocohumulone and isoadhumulone; also collectively known as isohumulones), beta-acids (or lupulones; mainly lupulone, colupulone and adlupulone), and derivatives of the aforementioned hop acids (for example reduced and oxidized derivatives), have a rather low solubility in aqueous media, especially in acidic aqueous conditions (Spetsig, Acta Chemica Scandinavica 9 (1955) 1421). At neutral pH and 298 K, alpha-acids have a solubility of about 5000 mg/L in water, while beta-acids have a solubility of only about 2 mg/L in water. During the wort boiling stage in the beer brewing process, typically at a pH value of about 5, the solubility is about 200 mg/L for the alpha-acids and about 10 mg/L for the beta-acids. Under the storage conditions of finished beer (pH 4 and 278 K), the solubility of alpha-acids is about 5 mg/L and <1 mg/L for the beta-acids, while the isomerized derivatives of the alpha-acids, i.e. the bitter iso-alpha-acids, have a solubility of about 120 mg/L under those conditions (Briggs et al., Brewing Science and Application (2004) 287, Woodhead Publishing Limited Cambridge England).

These variations in solubility in (acidic) aqueous media, with beta-acids exhibiting the lowest solubility, alpha-acids slightly higher, and the iso-alpha-acids the highest, are directly related to the pKa values of these hop acids. The beta-acids have pKa values around 6. The pKa values of the alpha-acids are around 5 (cohumulone 4.7, humulone 5.5 and adhumulone 5.7) and the iso-alpha-acids have pKa values of about 4. This implies that upon addition of iso-alpha-acids, and especially of alpha-acids and beta-acids, to an (acidic) aqueous medium with a pH about 5 (wort boiling conditions) or about 4 (finished beer conditions) a large fraction of the added hop acids will remain in the free acid form and will thus not readily dissolve in the acidic aqueous medium.

This low solubility of hop acids in acidic aqueous media has major disadvantages for their application in brewing (Meilgaard et al., Proceedings of the European Brewery Convention (1955) 109). As a consequence of their low solubility, typically only 50-55% of the alpha-acids (for example added as hop pellets or as a hop extract, produced by extraction of hop pellets using e.g. liquid or supercritical $CO_2$) are extracted into and dissolved in the boiling wort medium, and only this dissolved alpha-acid fraction readily isomerizes to the desired, bitter iso-alpha-acids (Briggs et al., Brewing Science and Application (2004) 287, Woodhead Publishing Limited Cambridge England). After the wort boiling stage, the iso-alpha-acid yield is typically about 40 to 45%, which corresponds to an isomerization efficiency of about 80% for the dissolved alpha-acids. A higher fraction of extracted and dissolved alpha-acids in the boiling wort medium would thus positively affect the alpha-acid bittering utilization. Alpha-acid (bittering) utilization is defined as the fraction in terms of percentage of bitter iso-alpha-acids in the final beer versus the quantity of alpha-acids added during the brewing process. With further iso-alpha-acid losses after the wort boiling stage (because of lower solubility at beer pH, association to the yeast, adsorption to the filter, etc.), alpha-acid bittering utilizations for additions to the (boiling) wort (e.g. at 50 ppm alpha-acid addition levels) are typically in the 30 to 35% range.

Moreover, given the even lower solubility of beta-acids in the (boiling) wort, the actual use of their bacteriostatic potential in the brew kettle is even more limited as a result of an even lower fraction of dissolved beta-acids, with dissolved beta-acid fractions below 5% for 20 ppm beta-acid addition levels.

Low efficiencies are also observed when iso-alpha-acids in the free acid form, such as in the case of isomerized hop extracts, also known as isomerized kettle extracts, (produced, starting from a regular hop extract, by alpha-acid isomerisation in alkaline aqueous conditions followed by acidification of the process mixture to yield iso-alpha-acids in the free acid form as an organic layer, also containing beta-acids and hop oils), are added to the (boiling) wort, typically leading to iso-alpha-acid utilizations of 45 to 50% (e.g. at 40 ppm iso-alpha-acid addition levels), as a result of the limited extraction of the iso-alpha-acids from the isomerized kettle extract (IKE) phase into the acidic wort medium. Iso-alpha-acid (bittering) utilization is defined as the fraction in terms of percentage of bitter iso-alpha-acids in the final beer versus the quantity of iso-alpha-acids added during the brewing process.

Upon addition of reduced derivatives of iso-alpha-acids (such as tetrahydro-iso-alpha-acids, with a higher hydrophobicity and therefore lower solubility in aqueous media compared to the non-reduced iso-alpha-acids) in the free acid form, to the (boiling) wort, low utilizations (20-40%) are also obtained.

To improve the efficiency of extraction and dissolution of hop acids in (acidic) aqueous media and thus the brewing utilization of these hop acids, methods involving transformation of the hop acids to specific derivatives have been proposed. The primary focus has been on increasing the addition efficiency of iso-alpha-acids for post-fermentation bittering application.

Koller reported on the use of alkaline earth metal (e.g. Mg) salts of the iso-alpha-acids (e.g. in the form of finely ground particles) as beer bittering agents (Koller, Journal of the Institute of Brewing 75 (1969) 175). The same Mg salts of iso-alpha-acids can be found in isomerized hop pellets (hop pellets in which a >90% fraction of the alpha-acids is transformed into Magnesium-iso-alpha-acid salts or magnesium isohumulates), a hop product type widely applied for additions to (boiling) wort. These Mg isohumulates (added as isomerized hop pellets) however result in iso-alpha-acid utilizations comparable to or slightly lower than the utilizations obtained with iso-alpha-acids in the free acid form (as in an IKE), to say 40-45%, in the case of additions to the wort.

Alternatively, U.S. Pat. No. 3,532,504 (1970) reports on the alkali metal (e.g. K) salts of iso-alpha-acids as bittering agents, leading to increased iso-alpha-acid dissolution efficiencies and thus iso-alpha-acid utilizations in comparison with iso-alpha-acids added in free acid form. U.S. Pat. No. 3,949,092 (1976) also reports the use of potassium salts of iso-alpha-acids as beer flavoring agents. U.S. Pat. No. 5,015,491 (1991) informs on the production of such alkali metal isohumulates. PIKE, an isomerized hop extract mixed with a potassium compound, is also a beer bittering agent of the alkali metal-iso-alpha-acid salt type, however during the PIKE production undesirable alkaline degradation of the iso-alpha-acids can occur. In the brewing practice, it is known that these alkali metal isohumulates (as in PIKE) can lead to iso-alpha-acid utilizations above 50% for additions to the (boiling) wort, which represents a limited improvement compared to adding iso-alpha-acids in the free acid form. In GB 1,058,975 and 1,058,976, multi-step processes for the production of alkali metal salts of alpha-acids in powder form were presented.

Hudson and Rudin introduced ammonia-iso-alpha-acid complexes, prepared by passing ammonia in a methanolic solution of iso-alpha-acids (Hudson and Rudin, Journal of the Institute of Brewing 65 (1959) 416). U.S. Pat. No. 3,636,495 (1970) reports on a method for the preparation of granular ammonia-iso-alpha-acid complexes in an anhydrous solvent. The preparation of these ammonia-iso-alpha-acid complexes however involves the use of toxic and corrosive ammonia gas as well as hydrocarbon solvents. The iso-alpha-acid utilization obtained with these ammonia-iso-alpha-acid complexes was however below 40% for addition to the wort with a 50 ppm iso-alpha-acid addition level.

The above shows that in the prior art three principal methods were introduced to increase the extraction and dissolution efficiency of hop acids upon addition of those hop acids to (acidic) aqueous media during the brewing process, such as the (boiling) wort in the brew kettle or the brewed beverage stream prior to the final filtration. These methods are based on the formation of alkaline earth metal-hop acid salts, on the formation of alkali metal-hop acid salts or on the formation of ammonia-hop acid complexes. Only the alkali metal-hop acid salts lead to a marked improvement in terms of extraction efficiency into an (acidic) aqueous medium, such as wort, compared to the analogous hop acids in the free acid form.

These methods have however a number of limitations and drawbacks; there thus remains a need for an improved method for the extraction and the dissolution of hop acids in aqueous media, and in particular a need for a method to increase the utilization of hop acids in the brewing process.

DESCRIPTION OF THE INVENTION

The inventors have found that the utilization of hop acids, such as alpha-acids and (reduced) iso-alpha-acids, in the preparation of a brewed beverage, in particular a beer, is improved by the addition of specific complexes of these hop acids during the brewing process instead of the conventional addition of these hop acids in the free acid form or as magnesium or potassium salts of these hop acids.

Accordingly, the present invention relates to a method for preparing a brewed beverage, in particular for brewing a beer, comprising the addition of complexes of hop acids (one type or more than one type) with carbon-containing chemical substances (one type or more than one type) with at least one functional group containing a nitrogen atom with a lone electron pair and at least one other polar and/or hydrophilic functional group during the brewing process. Examples of such complexes are L-lysine-alpha-acid complexes, N-methyl-glucamine-beta-acid complexes and potassium glycinate-iso-alpha-acid complexes.

The present invention further relates to a method for preparing a brewed beverage, comprising the formation of complexes of hop acids (one type or more than one type) with carbon-containing chemical substances (one type or more than one type) with at least one functional group containing a nitrogen atom with a lone electron pair and at least one other polar and/or hydrophilic functional group, and the addition of complexes of hop acids with carbon-containing chemical substances with at least one functional group containing a nitrogen atom with a lone electron pair and at least one other polar and/or hydrophilic functional group during the brewing process.

The present invention further relates to a method for the formation of complexes of hop acids (one type or more than one type) with carbon-containing chemical substances (one type or more than one type) with at least one functional group containing a nitrogen atom with a lone electron pair and at least one other polar and/or hydrophilic functional group, comprising contacting (blending or mixing) a hop acids containing matter with carbon-containing chemical substances (one type or more than one type) having at least one functional group containing a nitrogen atom with a lone electron pair and at least one other polar and/or hydrophilic functional group, thereby forming complexes, with a higher solubility in (acidic) aqueous media compared to the corresponding hop acids in the free acid form, of the hop acids with the carbon-containing chemical substances with at least one functional group containing a nitrogen atom with a lone electron pair and at least one other polar and/or hydrophilic functional group, and with preferably at least a 0.1 weight % hop acid content in the hop acids containing matter or in the (aqueous) medium, mixture or blend wherein the complex formation occurs.

The present invention further relates to a method for the extraction into an aqueous medium of hop acids (one type or more than one type) from a hop acids containing matter and for the dissolution in an aqueous medium of hop acids extracted from said hop acids containing matter, comprising contacting (blending or mixing) a hop acids containing matter with carbon-containing chemical substances (one type or more than one type) having at least one functional group containing a nitrogen atom with a lone electron pair and at least one other polar and/or hydrophilic functional group, thereby forming complexes of the hop acids with the carbon-containing chemical substances with at least one functional group containing a nitrogen atom with a lone electron pair and at least one other polar and/or hydrophilic functional group, and with preferably at least a 0.1 weight % hop acid content in the hop acids containing matter or in the (aqueous) medium, mixture or blend wherein the complex formation occurs.

The invention further relates to a method for preparing a modified hop acids containing matter (suitable for addition during a brewing process), comprising formation of complexes of hop acids (one type or more than one type) with carbon-containing chemical substances (one type or more than one type) with at least one functional group containing a nitrogen atom with a lone electron pair and at least one other polar and/or hydrophilic functional group. Thus the hop acids containing matter is modified by the formation of these hop acid complexes.

The invention further relates to a method for preparing a modified hop acids containing matter (suitable for addition during a brewing process), comprising contacting a hop acids containing matter with carbon-containing chemical substances (one type or more than one type) having at least one functional group containing a nitrogen atom with a lone electron pair and at least one other polar and/or hydrophilic functional group, thereby forming complexes of hop acids with carbon-containing chemical substances with at least one functional group containing a nitrogen atom with a lone electron pair and at least one other polar and/or hydrophilic functional group, and with preferably at least a 0.1 weight % hop acid content in the hop acids containing matter or in the (aqueous) medium, mixture or blend wherein the complex formation occurs.

Further, the invention relates to hop acids containing matter containing complexes of hop acids (one type or more than one type) with carbon-containing chemical substances (one type or more than one type) with at least one functional group containing a nitrogen atom with a lone electron pair and at least one other polar and/or hydrophilic functional group.

Further, the invention relates to the use of complexes of hop acids (one type or more than one type) with carbon-containing chemical substances (one type or more than one type) with at least one functional group containing a nitrogen atom with a lone electron pair and at least one other polar and/or hydrophilic functional group, in the beer brewing process.

Further, the invention relates to the use of a hop acids containing matter, in which at least a fraction of the hop acids (one type or more than one type) are complexed with carbon-containing chemical substances (one type or more than one type) with at least one functional group containing a nitrogen atom with a lone electron pair and at least one other polar and/or hydrophilic functional group according to the invention, as a bittering agent, in particular as a bittering agent for beer.

The hop acids, the carbon-containing chemical substances with at least one functional group containing a nitrogen atom with a lone electron pair and at least one other polar and/or hydrophilic functional group, respectively the complexes may all be of one type or they may be of more than one type, i.e. at least two types of hop acids, or at least two carbon-containing chemical substances with at least one functional group containing a nitrogen atom with a lone electron pair and at least one other polar and/or hydrophilic functional group, or at least two types of complexes may be present in a product of the invention, or used or formed in a method of the invention.

Further, the invention relates to a brewed beverage, in particular a beer, obtainable by a method of the invention.

Further embodiments are shown in the description below and in the claims of which the text is incorporated in the description by reference.

For the purpose of clarity and a concise description, features are described herein as part of the same or separate embodiments, however, it will be appreciated that the scope of the invention may include embodiments having combinations of all or some of the features described.

The term 'hop acids' is used herein in particular for alpha-acids; alpha-acid derivatives, such as reduced alpha-acids and oxidized alpha-acids; iso-alpha-acids; iso-alpha-acid derivatives, such as reduced iso-alpha-acids and oxidized iso-alpha-acids; beta-acids; and beta-acid derivatives, such as reduced beta-acids and oxidized beta-acids.

The hop acids are generally selected from one or more of the following types: alpha-acids, beta-acids, iso-alpha-acids, reduced alpha-acids, reduced beta-acids, reduced iso-alpha-acids, oxidized alpha-acids, oxidized beta-acids and oxidized iso-alpha-acids. In particular, the hop acids are selected from one or more of the following types: alpha-acids, beta-acids, iso-alpha-acids and reduced iso-alpha-acids. Thus, one type of hop acids can be for example only alpha-acids, or only beta-acids, or only iso-alpha-acids, or only reduced iso-alpha-acids, or even only one analogue of for example alpha-acids (humulone) or iso-alpha-acids (isohumulone), etc. More than one type of hop acids can be any combination of hop acids, for example alpha-acids and beta-acids, or iso-alpha-acids and beta-acids, or alpha-acids, beta-acids and iso-alpha-acids, or iso-alpha-acids and reduced iso-alpha-acids, etc.

The term 'complex' should be understood in the meaning of a chemical substance, formed by the combination of other chemical substances and held together by forces that are chemical rather than physical. If in the complex formation between the hop acids and the carbon-containing chemical substances with at least one functional group containing a nitrogen atom with a lone electron pair and at least one other polar and/or hydrophilic functional group the proton transfer is complete, salts are formed. Examples of complexes of hop acids with carbon-containing chemical substances with at least one functional group containing a nitrogen atom with a lone electron pair and at least one other polar and/or hydrophilic functional group are L-lysine-alpha-acid complexes, N-methyl-glucamine-beta-acid complexes and potassium glycinate-iso-alpha-acid complexes.

For complexes, 'one type of complexes' means a complex of one type of hop acids with one type of carbon-containing chemical substances with at least one functional group containing a nitrogen atom with a lone electron pair and at least one other polar and/or hydrophilic functional group. 'More than one type of complexes' means that there are complexes differing from each other in that they contain a different type of hop acids and/or a different type of carbon-containing chemical substances with at least one functional group containing a nitrogen atom with a lone electron pair and at least one other polar and/or hydrophilic functional group.

We discovered, contrary to our insight at that time, that the complexes of hop acids and carbon-containing chemical substances with at least one functional group containing a nitrogen atom with a lone electron pair and at least one other polar and/or hydrophilic functional group have a markedly higher solubility in (acidic) aqueous media compared to corresponding hop acids in the free acid form. This unexpected phenomenon of increased solubility in (acidic) aqueous media was first observed in a lager beer brewing trial series to study the brewing application (i.a. final beer flavor and aroma profile) of two differently prepared isomerized hop extracts. One lager beer was prepared with a hop extract isomerized with L-proline (prepared as described in WO 2012/041994 A1 (2012)) added to the wort in the brew kettle; the other lager beer was prepared similarly apart from the use of an isomerized hop extract of the IKE type as bittering agent. From the bitterness analysis of the lager brewed with the L-proline isomerized hop extract, we learnt that the obtained iso-alpha-acid concentration was higher than expected on the basis of the typical iso-alpha-acid utilization range of 45-50% (upon addition of iso-alpha-acids in free acid form) for additions to the (boiling) wort (brew kettle addition); the actual iso-alpha-acid utilization was well above 55%. In the brewing trial bittered by means of conventional IKE, containing iso-alpha-acids in the free acid form, the typical iso-alpha-acid utilization upon addition to the wort of about 45% was observed.

This increased solubility in (acidic) aqueous media was thereafter also found in an experimental series comparing the efficiency of addition of iso-alpha-acids in the free acid form and of iso-alpha-acids complexed with L-proline to aqueous media with varying pH values. Subsequent experiments involving other hop acids (for example alpha-acids, beta-acids, etc.) and other carbon-containing chemical substances with at least one functional group containing a nitrogen atom with a lone electron pair and at least one other polar and/or hydrophilic functional group, such as N-methyl-glucamine and potassium glycinate, demonstrated that this increased solubility effect was not limited to the L-proline-iso-alpha-acid complex.

These observations were indeed counterintuitive. Based on the iso-alpha-acid utilizations reported in the prior art for the ammonia-iso-alpha-acid complexes (iso-alpha-acid utilizations upon addition to the wort below 40% for the ammonia-iso-alpha-acid complexes versus 45-50% for the iso-alpha-acids in free acid form), a person skilled in the art would remove the carbon-containing chemical substance with at least one functional group containing a nitrogen atom with a lone electron pair from the isomerized hop product (prepared as described in WO 2012/041994 A1 (2012)), by separation techniques such as washing and extraction, to improve the iso-alpha-acid utilization upon application of the isomerized hop product as beer bittering agent. A person skilled in the art would expect that the interaction of the water molecules in the aqueous medium with these complexes (to be considered as high-molecular-weight chemical substances composed of an iso-alpha-acid (molecular weight≈350 g/mole) and a carbon-containing chemical substance with at least one functional group containing a nitrogen atom with a lone electron pair and at least one other polar and/or hydrophilic functional group (typical molecular weight 100-200 g/mole)) would be less favorable in comparison with the strong and thus beneficial hydration of the alkali metal salts of these iso-alpha-acids, and would be at best comparable to the interaction with the iso-alpha-acids in the free acid form with also an all-organic character combined with a high, however substantially lower than the corresponding complex, molecular weight.

The present invention further relates to a method comprising contacting, blending or mixing hop acids containing matter with carbon-containing chemical substances (one type or more than one type) with one or more functional groups containing a nitrogen atom with a lone electron pair (a lone electron pair is a valence electron pair without bonding or sharing with other atoms) and at least one other polar and/or hydrophilic functional group, in the absence or presence of solvents, to obtain complexes of hop acids and carbon-containing chemical substances with at least one functional group containing a nitrogen atom with a lone electron pair and at least one other polar and/or hydrophilic functional group, which show a markedly higher solubility in (acidic) aqueous media compared to the corresponding hop acids in the free acid form.

There are in particular two application modes for the present invention, with the formation of the hop acid complexes ex-situ or with the formation of the hop acids complexes in-situ. The ex-situ formation, which can be performed on the brewery site or outside of the brewery site, of the hop acid complexes (in the absence or presence of solvents) involves the formation of the hop acid complexes, optionally with further processing, prior to their addition to an or another (more acidic) aqueous medium, for example prior to their addition to a (boiling) wort medium (in the brew kettle) or prior to their post-fermentation addition. In the second application mode, i.e. the in-situ formation of the hop acid complexes in an aqueous medium, which can be carried out on the brewery site or outside of the brewery site, the hop acids are transformed into hop acid complexes in an aqueous medium upon contacting the hop acids containing matter with carbon-containing chemical substances with at least one functional group containing a nitrogen atom with a lone electron pair and at least one other polar and/or hydrophilic functional group, and subsequently the obtained aqueous phase (optionally after further processing, e.g. concentration, dilution, pH adjustment, etc.) containing the hop acid complexes can for example be added to a (boiling) wort medium or used for post-fermentation addition.

The addition of the complexes of hop acids (one type or more than one type) with carbon-containing chemical substances (one type or more than one type) with at least one functional group containing a nitrogen atom with a lone electron pair and at least one other polar and/or hydrophilic functional group can be at any stage of the brewing process, but will usually be prior to the final filtration, and typically to the wort or to the brewed beverage stream post-fermentation. The addition of (reduced or oxidized) alpha-acid complexes and (reduced or oxidized) beta-acid complexes will typically be to the wort. The addition of (reduced or oxidized) iso-alpha-acid complexes will typically be to the wort, but these (reduced or oxidized) iso-alpha-acid complexes are also particularly suitable for addition to the brewed beverage stream post-fermentation.

Examples of suitable carbon-containing chemical substances with at least one functional group containing a nitrogen atom with a lone electron pair and at least one other polar and/or hydrophilic functional group are amino acids (e.g. glycine, L-proline, beta-alanine and L-lysine), ester substances derived from amino acids (e.g. L-proline ethyl ester), amide substances derived from amino acids (e.g. L-prolinamide), (carboxylate) salt substances derived from amino acids (e.g. potassium glycinate and potassium L-lysinate), amino alcohols (e.g. L-prolinol and 2-amino-2-hydroxymethyl-propane-1,3-diol), amino sugars (e.g. glucosamine and N-methyl-glucamine), amino carbonyls (2-amino-acetaldehyde), amides, imides, ureas, amidines, guanidines, etc., and their (functionalized) derivatives, and also oligomeric or polymeric derivatives of these chemical substances; and wherein these chemical substances are non-cyclic, cyclic or heterocyclic.

Examples of such polar and/or hydrophilic functional groups are hydroxyl type functional groups, amino type functional groups, ether type functional groups, carbonyl type functional groups, carboxylic acid type functional groups, carboxylate type functional groups, ester type functional groups, amide type functional groups, etc. It is understood that this list is not limitative.

The carbon-containing chemical substances with at least one functional group containing a nitrogen atom with a lone electron pair and at least one other polar and/or hydrophilic functional group applied for the complex formation with a specific hop acid have preferably at least one functional group containing a nitrogen atom with a pKb value below 14-pKa of that hop acid.

In a preferred embodiment of the present invention, carbon-containing chemical substances with at least one functional group containing a nitrogen atom with a lone electron pair and at least one other polar and/or hydrophilic functional group that are safe, that have GRAS status for food and beverage applications, that are food additives, that are processing aids used in food and beverage industries, that are naturally occurring (in the human body) or that are generally present in beer, are used.

One type of carbon-containing chemical substances with at least one functional group containing a nitrogen atom with a lone electron pair and at least one other polar and/or hydrophilic functional group generally means that they all have the same chemical structural formula. Thus one type of this chemical substance can be for example only potassium glycinate, or only L-lysine, or only N-methyl-glucamine, etc. More than one type of carbon-containing chemical substances with at least one functional group containing a nitrogen atom with a lone electron pair and at least one other polar and/or hydrophilic functional group can be any combination of carbon-containing chemical substances with at least one functional group containing a nitrogen atom with a lone electron pair and at least one other polar and/or hydrophilic functional group, for example glycine and potassium glycinate, or glycine, L-lysine and potassium glycinate, etc.

The hop acids containing matter can be hop cones, powdered hops, powdered hops containing iso-alpha-acids, hop pellets, hop pellets enriched in alpha-acids, hop pellets containing iso-alpha-acids, hop extracts, alpha-acid enriched hop extracts, hop base extracts, (purified) beta-acid extracts, hop extracts containing alpha-acids and beta-acids, hop extracts containing apart from the alpha-acids and beta-acids also hop oils and/or hop hard resins, hop extracts containing iso-alpha-acids, hop extracts enriched in iso-alpha-acids, extracts of purified iso-alpha-acids, concentrates of iso-alpha-acids, hop extracts containing iso-alpha-acids and beta-acids, hop extracts containing apart from iso-alpha-acids and beta-acids also hop oils and/or hop hard resins, hop extracts enriched in reduced or oxidized hop acids, extracts of purified reduced or oxidized hop acids and concentrates containing reduced or oxidized hop acids. It is understood that this list of types of hop acids containing matter is not limitative, and also other types of hop acids containing matter can be used within the present invention.

The complexes of the hop acids with the carbon-containing chemical substances with at least one functional group containing a nitrogen atom with a lone electron pair and at least one other polar and/or hydrophilic functional group can be formed, in the absence of solvents (solvent-free conditions), by blending or mixing the carbon-containing chemical substances (one type or more than one type) with at least one functional group containing a nitrogen atom with a lone electron pair and at least one other polar and/or hydrophilic functional group with for example powdered hops containing alpha-acids (eventually prior to pelletization of the blend material), or hop extracts containing alpha-acids, or isomerized hop extracts containing iso-alpha-acids. These complexes of hop acids and carbon-containing chemical substances with at least one functional group containing a nitrogen atom with a lone electron pair and at least one other polar and/or hydrophilic functional group can also be formed in the presence of (organic) solvents or mixtures of solvents, such as water and ethanol. The addition of a solvent (e.g. ethanol) can for example facilitate the complex formation by lowering the viscosity of a hop extract (such as a very viscous purified beta-acid extract) and thus improving the mixing (or mixability) of the hop acids with the carbon-containing chemical substances with at least one functional group containing a nitrogen atom with a lone electron pair and at least one other polar and/or hydrophilic functional group.

The pre-dissolution in an aqueous medium of the carbon-containing chemical substances (one type or more than one type) with at least one functional group containing a nitrogen atom with a lone electron pair and at least one other polar and/or hydrophilic functional group, in particular for amino sugars (e.g. N-methyl-glucamine) and alkali metal salts of amino acids (e.g. potassium glycinate), prior to the addition of the hop acids containing matter, can be beneficial for the hop acid complex formation by improving the dispersion of the carbon-containing chemical substances with at least one functional group containing a nitrogen atom with a lone electron pair and at least one other polar and/or hydrophilic functional group in the processing mixture or medium.

To achieve a high fraction of complexed hop acids by applying amino acids with only one functional group containing a nitrogen atom with a lone electron pair as such as the carbon-containing chemical substances with at least one functional group containing a nitrogen atom with a lone electron pair and at least one other polar and/or hydrophilic functional group, a low presence of water (water content <10 weight % of the hop acids containing matter, or of the processing mixture or blend) during the complex formation is preferred.

The formation of the complexes of the hop acids with the carbon-containing chemical substances with at least one functional group containing a nitrogen atom with a lone electron pair and at least one other polar and/or hydrophilic functional group can be positively affected by an increase in processing temperature (as a result of improved formation kinetics and lower viscosity, as in the case of viscous hop acid extracts); however too high temperatures could cause undesired degradation of thermally instable hop substances present in the hop acids containing matter. The processing temperature for the hop acid complex formation is usually below 408 K. Processing temperatures below 378 K are preferred, processing temperatures below 363 K are more preferred, and processing temperatures below 343 K are most preferred. Processing temperatures below 333 K are particularly preferred. The formation of the complexes of the hop acids with the carbon-containing chemical substances with at least one functional group containing a nitrogen atom with a lone electron pair is usually carried out at a temperature of 278 K or more.

Another variable affecting the complex formation is the molar ratio of carbon-containing chemical substance with at least one functional group containing a nitrogen atom with a lone electron pair and at least one other polar and/or hydrophilic functional group (one type or more than one type of carbon-containing chemical substances with at least one functional group containing a nitrogen atom with a lone electron pair and at least one other polar and/or hydrophilic functional group) versus hop acid (one type or more than one type of hop acids) intended to be complexed, which will most typically be alpha-acids and/or iso-alpha-acids. To achieve a high fraction of complexed hop acids (one type or more than one type) or particularly a (nearly) complete complex formation, at least the same molar amount of carbon-containing chemical substances (one type or more than one type) with at least one functional group containing a nitrogen atom with a lone electron pair and at least one other polar and/or hydrophilic functional group as the molar amount of hop acids (intended to be complexed) is preferred. An excess (or a higher relative concentration) of the carbon-containing chemical substance(s) with at least one functional group containing a nitrogen atom with a lone electron pair and at least one other polar and/or hydrophilic functional group, and thus a molar ratio versus hop acid (intended to be complexed) higher than 1, is useful to ensure that at least a large fraction (preferably >50%, more preferably >70%, most preferably >90%) of the hop acids (intended to be complexed) are complexed with carbon-containing chemical substances (one type or more than one type) with at least one functional group containing a nitrogen atom with a lone electron pair and at least one other polar and/or hydrophilic functional group within reasonable time (as a result of the higher complex formation rate). This molar ratio of carbon-containing chemical substances (one type or more than one type) with at least one functional group containing a nitrogen atom with a lone electron pair and at least one other polar and/or hydrophilic functional group versus hop acids (one type or more than one type), to be complexed, is usually at least 1:20, in particular at least 1:10, more in particular at least 1:5, preferably at least 1:2, more preferably at least 1:1. Usually, this molar ratio is 20:1 or less, in particular 10:1 or less, more in particular 5:1 or less, preferably 2:1 or less.

Higher fractional contents or concentrations of hop acids (one type or more than one type) and carbon-containing chemical substances (one type or more than one type) with at least one functional group containing a nitrogen atom with a lone electron pair and at least one other polar and/or hydrophilic functional group in the process medium also lead to shorter processing times as the incidence of contact (followed by complex formation) between the hop acids and the carbon-containing chemical substances with at least one functional group containing a nitrogen atom with a lone electron pair and at least one other polar and/or hydrophilic functional group is higher. For this reason, hop acid contents of more than 0.1 weight % in the hop acids containing matter, or in the medium, mixture or blend wherein the complex formation occurs, are preferred. At lower hop acid contents or concentrations, the incidence of contact (and thus complex formation) between the hop acids and the carbon-containing chemical substances with at least one functional group containing a nitrogen atom with a lone electron pair and at least one other polar and/or hydrophilic functional group becomes too low and thus very long processing times would be required. Hop acid contents in the hop acids containing matter, or in the medium, mixture or blend wherein the complex formation occurs, of 0.25 weight % or more are more preferred, and of 0.5 weight % or more are most preferred. Hop acid contents in the hop acids containing matter, or in the medium, mixture or blend wherein the complex formation occurs of 1.0 weight % or more are particularly preferred.

Targeted (preferential) extraction of specific hop acids (one type or more than one type) from a hop acids containing matter containing different types of hop acids into an (acidic) aqueous medium can be achieved by varying the (molar) amount of added carbon-containing chemical substances (one type or more than one type) with one or more functional groups containing a nitrogen atom with a lone electron pair and at least one other polar and/or hydrophilic functional group relative to the total (molar) amount of hop acids present in the hop acids containing matter, as the complex formation of a specific hop acid is dependent on its pKa value, with primarily the complex formation for the hop acids with the lowest pKa value. An application of this preferential extraction would for example be the targeted removal of alpha-acids and/or iso-alpha-acids from (isomerized) hop extracts also containing beta-acids. This can be achieved by adding the same molar amount of carbon-containing chemical substances (one type or more than one type) with one or more functional groups containing a nitrogen atom with a lone electron pair and at least one other polar and/or hydrophilic functional group as the molar amount of present iso-alpha-acids and/or alpha-acids, but without an excess as this would lead to extraction of the beta-acids into the aqueous medium. An analogous approach can be applied for additions to the (boiling) wort, as the brewing utilizations of the alpha-acids and/or iso-alpha-acids are more important for breweries than the beta-acid utilizations, and the application of an non-effective excess of the carbon-containing chemical substances with one or more functional groups containing a nitrogen atom with a lone electron pair and at least one other polar and/or hydrophilic functional group should be avoided for cost-efficiency reasons. In addition, the hop oils present in a hop acids containing matter can be separated as an organic layer enriched in hop oils (or an organic layer of purified hop oils), after extracting (a large fraction of) the hop acids present in the hop acids containing matter, also containing hop oils, into an aqueous medium (aqueous layer in the biphasic system), by adding a sufficient amount of a carbon-containing chemical substances (one type or more than one type) with one or more functional groups containing a nitrogen atom with a lone electron pair and at least one other polar and/or hydrophilic functional group.

Preferably, the contacting of the hop acids containing matter with the carbon-containing chemical substances (one type or more than one type) with one or more functional groups containing a nitrogen atom with a lone electron pair and at least one other polar and/or hydrophilic functional group, to obtain the hop acid complexes, is allowed to proceed under conditions suitable to obtain a high fraction of the hop acids (one type or more than one type), intended to be complexed, complexed with carbon-containing chemical substances (one type or more than one type) with one or more functional groups containing a nitrogen atom with a lone electron pair and at least one other polar and/or hydrophilic functional group. Applying optimized conditions for the hop acid complex formation, a >70% fraction of complexed hop acids (intended to be complexed) or even a >90% fraction of complexed hop acids (intended to be complexed) can be achieved with processing times as short as 30 min. Short processing times are moreover beneficial to avoid undesired (thermal) degradation of the relatively instable hop acids and other hop substances.

Preferably, the contacting of the hop acids containing matter with carbon-containing chemical substances (one type or more than one type) with one or more functional groups containing a nitrogen atom with a lone electron pair and at least one other polar and/or hydrophilic functional group, to obtain the hop acid complexes, occurs under an oxygen-free atmosphere or in low oxygen conditions to avoid oxidative degradation of the hop acids and/or other hop substances such as hop oils that may be present. Suitable inert atmospheres can be created using gases like nitrogen or noble gases.

The details of the invention will be explained below with reference to the Examples.

In a preferred embodiment of the present invention, the hop acids containing matter are hop extracts enriched in alpha-acids (or purified alpha-acid extracts or alpha-acid concentrates), hop extracts enriched in beta-acids (or purified beta-acid extracts or beta-acid concentrates) or hop extracts enriched in iso-alpha-acids (or purified iso-alpha-acid extracts or iso-alpha-acid concentrates). The hop acids, in particular respectively the alpha-acids, the beta-acids or the iso-alpha-acids, are, in the ex-situ application mode, (partially) complexed (to the corresponding alpha-acid, beta-acid or iso-alpha-acid complexes) upon mixing with carbon-containing chemical substances (or a mixture of such substances) with one or more functional groups containing a nitrogen atom with a lone electron pair and at least one other polar and/or hydrophilic functional group, optionally with further processing (e.g. water addition) after the complex formation, prior to their addition to an (acidic) aqueous medium. This embodiment is especially useful to produce aqueous solutions of alpha-acids, aqueous solutions of beta-acids or aqueous solutions of iso-alpha-acids that can be used as hop acid formulations during the brewing process, for example for post-fermentation additions.

In another preferred embodiment of the present invention, the hop acids containing matter is a hop extract (containing among other hop compounds alpha-acids and beta-acids) or an isomerized hop extract (containing among others hop compounds iso-alpha-acids and beta-acids). The hop acids present in this hop extract or isomerized hop extract, in particular respectively the alpha-acids and the iso-alpha-acids, are, in the ex-situ application mode, (partially) transformed into complexes upon mixing with carbon-containing chemical substances (or a mixture of such substances) with one or more functional groups containing a nitrogen atom with a lone electron pair and at least one other polar and/or hydrophilic functional group, optionally with further processing after the complex formation, prior to their addition to an (acidic) aqueous medium. This embodiment is particularly useful to achieve higher utilizations of alpha-acids or iso-alpha-acids in the case of additions of hop extracts or isomerized hop extracts to the (boiling) wort (in the brew kettle).

In another preferred embodiment of the present invention, the modified hop extract or the modified isomerized hop extract, in which especially the alpha-acids or iso-alpha-acids have (partially) been transformed into complexes with carbon-containing chemical substances with one or more functional groups containing a nitrogen atom with a lone electron pair and at least one other polar and/or hydrophilic functional group, obtained by mixing the hop extract or the isomerized hop extract with carbon-containing chemical substances with one or more functional groups containing a nitrogen atom with a lone electron pair and at least one other polar and/or hydrophilic functional group, optionally with further processing after the complex formation, is added to an (acidic) aqueous medium, such as the (boiling) wort (in the brew kettle).

In another preferred embodiment of the present invention, the hop acids containing matter are powdered hops or hop pellets (containing among others alpha-acids and beta-acids). The hop acids, in particular the alpha-acids, in the powdered hops or hop pellets are, in the ex-situ application mode, (partially) complexed upon blending with carbon-containing chemical substances (or a mixture of such substances) with one or more functional groups containing a nitrogen atom with a lone electron pair and at least one other polar and/or hydrophilic functional group, optionally with further processing, prior to their addition to the aqueous medium. This embodiment is particularly helpful to achieve higher utilizations of in particular alpha-acids but also beta-acids in the case of additions of powdered hops or hop pellets to the (boiling) wort (in the brew kettle).

In another preferred embodiment of the present invention, the modified powdered hops or the modified hop pellets, in which the hop acids, in particular the alpha-acids, have (partially) been transformed into complexes with carbon-containing chemical substances with one or more functional groups containing a nitrogen atom with a lone electron pair and at least one other polar and/or hydrophilic functional group, obtained by blending the powdered hops or the hop pellets with carbon-containing chemical substances with one or more functional groups containing a nitrogen atom with a lone electron pair and at least one other polar and/or hydrophilic functional group, are added, optionally after further processing, to an (acidic) aqueous medium, such as the (boiling) wort (in the brew kettle), for example to improve the alpha-acid utilization.

In another preferred embodiment of the present invention, the hop acids containing matter are extracts or concentrates containing reduced alpha-acids, oxidized alpha-acids, reduced beta-acids, oxidized beta-acids, reduced iso-alpha-acids or oxidized iso-alpha-acids. The hop acids are, in the ex-situ application mode, (partially) complexed upon mixing with carbon-containing chemical substances (or a mixture of such substances) with one or more functional groups containing a nitrogen atom with a lone electron pair and at least one other polar and/or hydrophilic functional group, optionally with further processing, prior to their addition to the aqueous medium. This embodiment is particularly useful to achieve higher utilizations of reduced and oxidized hop acids, in particular reduced iso-alpha-acids, in the case of additions to the (boiling) wort or of post-fermentation additions, as well as to produce (concentrated) aqueous solutions of such reduced or oxidized hop acids, in particular reduced iso-alpha-acids, eventually with water addition after the complex formation, that can be used as reduced or oxidized hop acid formulations during the brewing process, for example for post-fermentation additions.

In another preferred embodiment of the present invention, the hop acids containing matter is a hop extract (containing among other hop compounds alpha-acids and beta-acids) or an isomerized hop extract (containing among other hop compounds iso-alpha-acids and beta-acids). The hop acids, in particular respectively the alpha-acids and the iso-alpha-acids, present in the hop extract or isomerized hop extract are, in the in-situ application mode, (partially) transformed into complexes in an aqueous medium upon contacting with carbon-containing chemical substances (or a mixture of such substances) with one or more functional groups containing a nitrogen atom with a lone electron pair and at least one other polar and/or hydrophilic functional group to the aqueous medium and extracted into this aqueous medium, optionally with further processing, prior to their addition to another (acidic) aqueous medium, such as the (boiling) wort. This embodiment is particularly useful for extraction and dissolution of hop acids, especially alpha-acids and iso-alpha-acids, from a hop extract or an isomerized hop extract into an aqueous medium (relatively small volume of processing mixture (e.g. <100 L), and typically with a fractional content of added hop acid 0.1-10 weight %), at e.g. a neutral or slightly basic pH, prior to the addition of the hop acid complexes to the more acidic wort medium in the brew kettle (e.g. 100-500 hL volume), for example to improve the utilization of the alpha-acids and the iso-alpha-acids.

In another preferred embodiment of the present invention, the hop acids containing matter are powdered hops or hop pellets (containing among others alpha-acids and beta-acids). The hop acids, in particular the alpha-acids, in the powdered hops or hop pellets are, in the in-situ application mode, (partially) transformed into complexes in an aqueous medium upon contacting with carbon-containing chemical substances (or a mixture of such substances) with one or more functional groups containing a nitrogen atom with a lone electron pair and at least one other polar and/or hydrophilic functional group to the aqueous medium and extracted into the aqueous medium, optionally with further processing, prior to their addition to another (acidic) aqueous medium, for example a (boiling) wort. This embodiment is particularly helpful for extraction and dissolution of hop acids, particularly alpha-acids, from powdered hops or hop pellets into an aqueous medium, for example at a neutral pH or basic pH (preferably below pH 12, more preferably below pH 11, most preferably below pH 10), prior to the addition of the hop acid complexes to the more acidic wort medium in the brew kettle, for example to improve the utilization of the alpha-acids but also of the beta-acids. Moreover, if the pre-extraction vessel is equipped with a filter, it can facilitate the removal of the hops residue.

In another preferred embodiment of the present invention, the hop acids containing matter are hop extracts enriched in alpha-acids (or purified alpha-acid extracts or alpha-acid concentrates), hop extracts enriched in beta-acids (or purified beta-acid extracts or beta-acid concentrates) or hop extracts enriched in iso-alpha-acids (or purified iso-alpha-acids or beta-acid concentrates). The hop acids, respectively the alpha-acids, the beta-acids and the iso-alpha-acids are, in the in-situ application mode, (partially) transformed (into the corresponding alpha-acid complexes, beta-acid complexes or iso-alpha-acid complexes) in an aqueous medium upon contacting with carbon-containing chemical substances (or a mixture of such substances) with one or more functional groups containing a nitrogen atom with a lone electron pair and at least one other polar and/or hydrophilic functional group. This embodiment is especially useful to produce aqueous solutions (of alpha-acids, of beta-acids or of iso-alpha-acids) that can be used as hop acid formulations during the brewing process.

In another preferred embodiment of the present invention, the hop acids containing matter are extracts or concentrates containing reduced alpha-acids, oxidized alpha-acids, reduced beta-acids, oxidized beta-acids, reduced iso-alpha-acids or oxidized iso-alpha-acids. The hop acids are, in the in-situ application mode, (partially) transformed into complexes in an aqueous medium upon contacting with carbon-containing chemical substances (or a mixture of such substances) with one or more functional groups containing a nitrogen atom with a lone electron pair and at least one other polar and/or hydrophilic functional group, optionally with further processing, prior to their addition to another (more acidic) aqueous medium. This embodiment is particularly useful to produce (concentrated) aqueous solutions of such reduced or oxidized hop acids (e.g. 5 weight % of reduced hop acids and higher), that can be used as reduced or oxidized hop acid formulations during the brewing process.

In another preferred embodiment of the present invention, the aforementioned aqueous solution of reduced or oxidized hop acids, in which the reduced or oxidized hop acids are present as complexes with carbon-containing chemical substances with one or more functional groups containing a nitrogen atom with a lone electron pair and at least one other polar and/or hydrophilic functional group, is added, optionally after further processing, to an (acidic) aqueous medium, such as the (boiling) wort (in the brew kettle), or is for example added post-fermentation.

In another preferred embodiment of the present invention, the hop acids containing matter are hop extracts (containing alpha-acids) or isomerized hop extracts (containing iso-alpha-acids). The hop acids, in particular respectively the alpha-acids and the iso-alpha-acids, in the hop acids containing matter are (partially) transformed into complexes upon contacting with a (concentrated) aqueous solution of carbon-containing chemical substances (or a mixture of such substances) with one or more functional groups containing a nitrogen atom with a lone electron pair and at least one other polar and/or hydrophilic functional group. Next, the modified hop acids containing matter, optionally after further processing, can be added to another (more acidic) aqueous medium. This embodiment is particularly useful to produce modified hop acids containing matter that can be added during the brewing process, particularly for addition to the (boiling) wort.

In another preferred embodiment of the present invention, the hop acids containing matter are hop extracts enriched in (reduced or oxidized) alpha-acids, (reduced or oxidized) iso-alpha-acids or (reduced or oxidized) beta-acids, or concentrates of (reduced or oxidized) alpha-acids, (reduced or oxidized) iso-alpha-acids or (reduced or oxidized) beta-acids. The hop acids in the hop acids containing matter are (partially) transformed into complexes upon contacting with a (concentrated) aqueous solution of carbon-containing chemical substances (or a mixture of such substances) with one or more functional groups containing a nitrogen atom with a lone electron pair and at least one other polar and/or hydrophilic functional group. Next, the modified hop acids containing matter, optionally after further processing, can be added to another (more acidic) aqueous medium. This embodiment is particularly useful to produce modified hop acids containing matter that can be added during the brewing process.

The following Examples illustrate the invention:

Example 1. Ex-Situ Transformation of Alpha-Acids from a Hop Extract Enriched in Alpha-Acids Prior to Addition to Aqueous Medium All transformation and addition experiments in this Example were performed in triplicate for statistical reliability. The alpha-acid content of the hop acids containing matter, in this Example a hop extract enriched in alpha-acids, was 91 weight % alpha-acids.

To 0.55 g of this hop extract enriched in alpha-acids (containing 0.50 g of alpha-acids) were added varying mass amounts (but the same molar amounts as the molar amount of alpha-acids) of N-methyl-glucamine (0.27 g), potassium hydroxide (0.08 g) and magnesium oxide (0.06 g) in separate vessels.

After insertion of a magnetic stirrer, the vessels were closed, flushed with nitrogen gas and subsequently pressurized with 0.2 MPa nitrogen gas. Next, these mixtures were stirred and heated to 343 K for 15 min.

Next, 10 mL of purified water (preheated to 343 K) was added to these mixtures, followed by stirring for 15 min while keeping the temperature at 343 K and a nitrogen gas atmosphere.

Then, a 1 mL volume of the aqueous phase in each vessel was taken, and held in a closed, non-stirred vial at a temperature of 298 K for 60 min, prior to HPLC analysis with UV detection for the alpha-acids at 330 nm.

As a reference for the HPLC analysis and for the quantification of the extraction efficiency of the alpha-acids, an ethanolic solution was prepared, starting from the aforementioned hop extract enriched in alpha-acids, containing the same amount of alpha-acids in the same liquid volume as in the addition test vessels. Under these concentration conditions, the alpha-acids completely dissolve in the ethanolic solution, and the detected UV signal would thus correspond with a 100% alpha-acid extraction efficiency into the aqueous medium in the addition experiments.

In the control experiment without addition of a salt or complex forming chemical substance, a 2% addition efficiency for the alpha-acids was determined. With addition of N-methyl-glucamine, a 94% efficiency of extraction into the aqueous medium was determined. With KOH addition, a 61% efficiency of the alpha-acid extraction into the aqueous medium was found. The MgO addition led to a 4% alpha-acid extraction efficiency.

Example 2. Ex-Situ Transformation of Alpha-Acids from a Hop Extract Prior to Addition to Aqueous Medium The transformation and addition experiments in this Example were performed in triplicate for statistical reliability. The alpha-acid content of the hop acids containing matter, in this Example a hop extract, was 35 weight % alpha-acids.

To 1.43 g of this hop extract (containing 0.50 g of alpha-acids) were added varying mass amounts (but the same molar amounts as the molar amount of alpha-acids) of N-methyl-glucamine (0.27 g), potassium hydroxide (0.08 g) and magnesium oxide (0.06 g) in separate vessels.

After insertion of a magnetic stirrer, the vessels were closed, flushed with nitrogen gas and subsequently pressurized with 0.2 MPa nitrogen gas. Next, these mixtures were stirred and heated to 343 K for 15 min.

Next, 10 mL of purified water (preheated to 343 K) was added to these mixtures, followed by stirring for 15 min while keeping the temperature at 343 K and a nitrogen gas atmosphere.

As a reference for the HPLC analysis and for the quantification of the extraction efficiency of the alpha-acids, an ethanolic solution was prepared, starting from the aforementioned hop extract, containing the same amount of alpha-acids in the same liquid volume as in the addition test vessels. Under these concentration conditions, the alpha-acids completely dissolve in the ethanolic solution, and the detected UV signal would thus correspond with a 100% alpha-acid extraction efficiency into the aqueous medium.

Then, a 1 mL volume of the aqueous phase in each vessel was taken, and held in a closed, non-stirred vial at a temperature of 298 K for 60 min, prior to HPLC analysis.

The sample analyses were performed as described in Example 1.

In the control experiment without addition of a salt or complex forming chemical substance, a 2% addition efficiency for the alpha-acids was determined. In the experiment with addition of N-methyl-glucamine, a 88% addition efficiency was found. With KOH addition, a 56% efficiency of the alpha-acid addition was determined. The MgO addition led to a 3% alpha-acid addition efficiency.

Example 3. Ex-Situ Transformation of Alpha-Acids from Powdered Hops Prior to Addition to Aqueous Medium The transformation and addition experiments in this Example were performed in triplicate for statistical reliability. The alpha-acid content of the hop acids containing matter, in this Example powdered hops (obtained by cooled milling of dried hop cones), was 15 weight % alpha-acids.

To 3.33 g of powdered hops (containing 0.50 g of alpha-acids) were added varying mass amounts (but the same molar amounts as the molar amount of alpha-acids) of N-methyl-glucamine (0.27 g), potassium hydroxide (0.08 g) and magnesium oxide (0.06 g) in separate vessels.

After insertion of a magnetic stirrer, the vessels were closed, flushed with nitrogen gas and subsequently pressurized with 0.2 MPa nitrogen gas. Next, these mixtures were agitated and kept at 313 K for 60 min.

Next, 10 mL of purified water (preheated to 343 K) was added to these mixtures, followed by stirring for 15 min while keeping the temperature at 343 K and a nitrogen gas atmosphere.

As a reference for the HPLC analysis and for the quantification of the extraction efficiency of the alpha-acids, an ethanolic solution was prepared, starting from the aforementioned powdered hops, containing the same amount of alpha-acids in the same liquid volume as in the addition test vessels. Under these concentration conditions, the alpha-acids completely dissolve in the ethanolic solution, and the detected UV signal would thus correspond with a 100% alpha-acid extraction efficiency into the aqueous medium.

Then, a 1 mL volume of the aqueous phase in each vessel was taken, and held in a closed, non-stirred vial at a temperature of 298 K for 60 min, prior to HPLC analysis.

The sample analyses were performed as described in Example 1.

In the control experiment without addition of a salt or complex forming chemical substance, a 1% addition efficiency for the alpha-acids was determined. In the experiment with addition of N-methyl-glucamine, a 79% addition efficiency was found. With KOH addition, a 48% efficiency of the alpha-acid addition was determined. The MgO addition led to a 2% alpha-acid addition efficiency.

Example 4. Ex-Situ Transformation of Iso-Alpha-Acids from an Isomerized Hop Extract Prior to Addition to Aqueous Medium The transformation and addition experiments in this Example were performed in triplicate for statistical reliability. The iso-alpha-acid content of the hop acids containing matter, in this Example an isomerized hop extract, was 55 weight % iso-alpha-acids.

To 0.91 g of this isomerized hop extract (containing 0.50 g of iso-alpha-acids-acids) were added varying mass amounts (but the same molar amounts as the molar amount of iso-alpha-acids) of N-methyl-glucamine (0.27 g), potassium hydroxide (0.08 g) and magnesium oxide (0.06 g) in separate vessels.

After insertion of a magnetic stirrer, the vessels were closed, flushed with nitrogen gas and subsequently pressurized with 0.2 MPa nitrogen gas. Next, these mixtures were stirred and heated to 343 K for 15 min.

Next, 10 mL of purified water (preheated to 343 K) was added to these mixtures, followed by stirring for 15 min while keeping the temperature at 343 K and a nitrogen gas atmosphere.

As a reference for the HPLC analysis and for the quantification of the extraction efficiency of the iso-alpha-acids, an ethanolic solution was prepared, starting from the aforementioned isomerized hop extract, containing the same amount of iso-alpha-acids in the same liquid volume as in the addition test vessels. Under these concentration conditions, the iso-alpha-acids completely dissolve in the ethanolic solution, and the detected UV signal would thus correspond with a 100% iso-alpha-acid extraction efficiency into the aqueous medium.

Then, a 1 mL volume of the aqueous phase in each vessel was taken, and held in a closed, non-stirred vial at a temperature of 298 K for 60 min, prior to HPLC analysis.

The sample analyses were performed as described in Example 1, with UV detection for the iso-alpha-acids also at 256 nm.

In the experiment with addition of N-methyl-glucamine, a 98% efficiency was found. With KOH addition, a 72% efficiency of the iso-alpha-acid extraction was determined. The MgO addition led to a 7% iso-alpha-acid extraction efficiency.

Example 5. In-Situ Transformation of Alpha-Acids from a Hop Extract in Aqueous Medium All experiments in this Example were performed in triplicate for statistical reliability. The alpha-acid content of the hop acids containing matter, in this Example a hop extract, was 35 weight % alpha-acids.

To 1.43 g of this hop extract (containing 0.50 g of alpha-acids) were added varying mass amounts of N-methyl-glucamine (0.27 g and 0.44 g), or varying mass amounts of potassium glycinate (0.16 g and 0.26 g), or 0.08 g potassium hydroxide, or 0.06 g magnesium oxide, and 10 mL of purified water in separate vessels.

After insertion of a magnetic stirrer, the vessels were closed, flushed with nitrogen gas and subsequently pressurized with 0.2 MPa nitrogen gas. Next, these mixtures were stirred and heated to 343 K for 30 min.

As a reference for the HPLC analysis and for the quantification of the extraction efficiency of the alpha-acids, an ethanolic solution was prepared, starting from the aforementioned hop extract, containing the same amount of alpha-acids in the same liquid volume as in the addition test vessels. Under these concentration conditions, the alpha-acids completely dissolve in the ethanolic solution, and the detected UV signal would thus correspond with a 100% alpha-acid extraction efficiency into the aqueous medium.

Then, a 1 mL volume of the aqueous phase in each vessel was taken, and held in a closed, non-stirred vial at a temperature of 298 K for 60 min, prior to HPLC analysis.

The sample analyses were performed as described in Example 1.

In the control experiment without addition of a salt or complex forming chemical substance to the aqueous medium, a 2% extraction efficiency for the alpha-acids was determined. With addition of 0.27 g of N-methyl-glucamine, a 84% efficiency of extraction into the aqueous medium was determined. With addition of 0.44 g of N-methyl-glucamine to the aqueous medium, a 95% efficiency of the alpha-acid extraction into the aqueous medium was found. The addition of 0.16 g of potassium glycinate led to a 91% efficiency of extraction into the aqueous medium. With addition of 0.26 g of potassium glycinate to the aqueous medium, a >98% efficiency of the alpha-acid extraction into the aqueous medium was obtained. With 0.08 g addition of KOH, a 54% efficiency of the alpha-acid extraction was determined. The addition of 0.06 g MgO led to a 3% alpha-acid extraction efficiency.

Example 6. In-Situ Transformation of Iso-Alpha-Acids from an Isomerized Hop Extract in Aqueous Medium All experiments in this Example were performed in triplicate for statistical reliability. The iso-alpha-acid content of the hop acids containing matter, in this Example an isomerized hop extract, was 55 weight % iso-alpha-acids.

To 0.91 g of this isomerized hop extract (containing 0.50 g of iso-alpha-acids) were added varying mass amounts of N-methyl-glucamine (0.27 g and 0.44 g), or varying mass amounts of potassium glycinate (0.16 g and 0.26 g), or 0.08 g potassium hydroxide, or 0.06 g magnesium oxide, and 10 mL of purified water in separate vessels.

After insertion of a magnetic stirrer, the vessels were closed, flushed with nitrogen gas and subsequently pressurized with 0.2 MPa nitrogen gas. Next, these mixtures were stirred and heated to 343 K for 30 min.

As a reference for the HPLC analysis and for the quantification of the extraction efficiency of the iso-alpha-acids, an ethanolic solution was prepared, starting from the aforementioned isomerized hop extract, containing the same amount of iso-alpha-acids in the same liquid volume as in the addition test vessels. Under these concentration conditions, the iso-alpha-acids completely dissolve in the ethanolic solution, and the detected UV signal would thus correspond with a 100% iso-alpha-acid extraction efficiency into the aqueous medium.

Then, a 1 mL volume of the aqueous phase in each vessel was taken, and held in a closed, non-stirred vial at a temperature of 298 K for 60 min, prior to HPLC analysis.

The sample analyses were performed as described in Example 1, with UV detection for the iso-alpha-acids also at 256 nm.

In the experiment with addition of 0.27 g of N-methyl-glucamine, a 96% efficiency of extraction of the iso-alpha-acids into the aqueous medium was determined. With addition of 0.44 g of N-methyl-glucamine, a 98% efficiency of the iso-alpha-acid extraction into the aqueous medium was found. In the experiment with addition of 0.16 g of potassium glycinate led to a 98% efficiency of extraction into the aqueous medium. With addition of 0.26 g of potassium glycinate to the aqueous medium, a >98% efficiency of the iso-alpha-acid extraction into the aqueous medium was obtained. With 0.08 g addition of KOH, a 74% efficiency of the alpha-acid extraction was determined. The addition of 0.06 g MgO led to a 6% alpha-acid extraction efficiency.

Example 7. In-Situ Transformation of Hexahydro-Iso-Alpha-Acids from a Hop Extract Enriched in Hexahydro-Iso-Alpha-Acids in Aqueous Medium The transformation and addition experiments in this Example were performed in triplicate for statistical reliability. The hexahydro-iso-alpha-acid content of the hop acids containing matter, in this Example a hop extract enriched in hexahydro-iso-alpha-acids, was 85 weight % hexahydro-iso-alpha-acids.

To 0.59 g of this hop extract enriched in hexahydro-iso-alpha-acids (containing 0.50 g of hexahydro-iso-alpha-acids-acids) were added varying mass amounts (but the same molar amounts as the molar amount of hexahydro-iso-alpha-acids) of N-methyl-glucamine (0.27 g), potassium glycinate (0.16 g) or potassium hydroxide (0.08 g), and 10 mL of purified water in separate vessels.

After insertion of a magnetic stirrer, the vessels were closed, flushed with nitrogen gas and subsequently pressurized with 0.2 MPa nitrogen gas. Next, these mixtures were stirred and heated to 343 K for 30 mm.

As a reference for the HPLC analysis and for the quantification of the extraction efficiency of the hexahydro-iso-alpha-acids, an ethanolic solution was prepared, starting from the aforementioned hop extract enriched in hexahydro-iso-alpha-acids, containing the same amount of hexahydro-iso-alpha-acids in the same liquid volume as in the addition test vessels. Under these concentration conditions, the hexahydro-iso-alpha-acids completely dissolve in the ethanolic solution, and the detected UV signal would thus correspond with a 100% hexahydro-iso-alpha-acid extraction efficiency into the aqueous medium.

Then, a 1 mL volume of the aqueous phase in each vessel was taken, and held in a closed, non-stirred vial at a temperature of 298 K for 60 min, prior to HPLC analysis.

The sample analyses were performed as described in Example 1, with UV detection for the hexahydro-iso-alpha-acids also at 256 nm.

In the experiment with addition of N-methyl-glucamine, a 91% efficiency of the hexahydro-iso-alpha-acid addition was found. In the experiment with potassium glycinate, an extraction efficiency was 94% was obtained. With KOH addition, a 65% efficiency of the hexahydro-iso-alpha-acid extraction was determined.

Example 8. Ex-Situ Transformation of Iso-Alpha-Acids from an Isomerized Hop Extract Prior to Addition to Aqueous Medium The transformation and addition experiments in this Example were performed in triplicate for statistical reliability. The iso-alpha-acid content of the hop acids containing matter, in this Example an isomerized hop extract, was 55 weight % iso-alpha-acids.

To 0.91 g of this isomerized hop extract (containing 0.50 g of iso-alpha-acids-acids) were added varying mass amounts (but the same molar amounts as the molar amount of iso-alpha-acids) of L-lysine (0.20 g), 2-amino-acetaldehyde (0.08 g), 1-amino-2-propanol (0.10 g), and N,N'-dimethylethylenediamine (0.12 g) in separate vessels.

After insertion of a magnetic stirrer, the vessels were closed, flushed with nitrogen gas and subsequently pressurized with 0.2 MPa nitrogen gas. Next, these mixtures were stirred and heated to 343 K for 15 min.

Next, 10 mL of purified water (preheated to 343 K) was added to these mixtures, followed by stirring for 15 min while keeping the temperature at 343 K and a nitrogen gas atmosphere.

As a reference for the HPLC analysis and for the quantification of the extraction efficiency of the iso-alpha-acids, an ethanolic solution was prepared, starting from the aforementioned pre-isomerized hop extract, containing the same amount of iso-alpha-acids in the same liquid volume as in the addition test vessels. Under these concentration conditions, the iso-alpha-acids completely dissolve in the ethanolic solution, and the detected LTV signal would thus correspond with a 100% iso-alpha-acid extraction efficiency into the aqueous medium.

Then, a 1 mL volume of the aqueous phase in each vessel was taken, and held in a closed, non-stirred vial at a temperature of 298 K for 60 min, prior to HPLC analysis.

The sample analyses were performed as described in Example 1, with UV detection for the iso-alpha-acids also at 256 nm.

With L-lysine, a 83% iso-alpha-acid extraction efficiency was obtained. The addition of 2-amino-acetaldehyde led to a 78% iso-alpha-acid extraction efficiency. With 1-amino-2-propanol, a 52% iso-alpha-acid extraction efficiency was obtained. The addition of N,N'-dimethylethylenediamine led to a 76% iso-alpha-acid extraction efficiency.

Example 9. Preparation of a Modified Hop Extract (Containing Alpha-Acid Complexes) and a Modified Isomerized Hop Extract Prior to Addition of Alpha-Acid Complexes or Iso-Alpha-Acid Complexes to the Wort The transformation and brewing experiments in this Example were performed in duplicate. In this Example, the alpha-acid content of the alpha-acids containing matter (a hop extract) was 50 weight %, while the iso-alpha-acid content of the iso-alpha-acids containing matter (an isomerized hop extract) was 50 weight %.

40.1 g of N-methyl-glucamine in 50 g of purified $H_2O$ was added to 100 g of hop extract (containing 50 g of alpha-acids) at 328 K in a vessel (corresponding to a molar ratio of N-methyl-glucamine versus alpha-acid of about 1.5). Next, the vessel was closed, flushed with nitrogen gas, and pressurized with 0.2 MPa nitrogen gas. Then the mixture was stirred and kept at 328 K for 30 min. A modified hop extract containing N-methyl-glucamine-alpha-acid complexes, with an alpha-acid content of about 26.3 weight % was obtained, as determined by HPLC analysis.

20.9 g of potassium glycinate in 10 g of purified $H_2O$ was added to 100 g of hop extract or to 100 g of isomerized extract (containing respectively 50 g of alpha-acids or 50 g of iso-alpha-acids) at 328 K in separate vessels (corresponding to molar ratios of potassium glycinate versus alpha-acid or iso-alpha-acid of about 1.35). Next, the vessels were closed, flushed with nitrogen gas, and pressurized with 0.2 MPa nitrogen gas. Then the mixtures were stirred and kept at 328 K for 30 min. A modified hop extract, with an alpha-acid content of about 38.2 weight %, and a modified isomerized hop extract, with an iso-alpha-acid content of about 38.2 weight %, were obtained, as determined by HPLC analysis.

20.5 g of L-proline was added to 100 g of isomerized hop extract (containing 50 g of iso-alpha-acids) at 338 K in a vessel (corresponding to a molar ratio of L-proline versus iso-alpha-acid of about 1.3). Next, the vessel was closed, flushed with nitrogen gas, and pressurized with 0.2 MPa nitrogen gas. Then the mixture was stirred and kept at 338 K for 30 min. A modified isomerized hop extract, with an iso-alpha-acid content of about 41.5 weight % was obtained, as determined by HPLC analysis.

Next, varying amounts of the aforementioned modified hop extracts (in each case containing 4 g of alpha-acids) and modified isomerized hop extracts (in each case containing 4 g of iso-alpha-acids) were added to separate 100 L boiling lager wort volumes (start pH 5.4), prepared from lager malt, which corresponds to alpha-acid and iso-alpha-acid additions of 40 mg/L. The wort was boiled for 60 min after the addition of the modified (isomerized) hop extracts.

After the wort boiling, the wort volume was cooled to 285 K and a 100 mL volume was taken from the cooled wort, and held in a closed brown-glass bottle at 283 K for 3 h, prior to HPLC analysis of the cooled wort sample (with UV detection of the iso-alpha-acids at 256 nm) after sample homogenization.

Thereafter, the cooled wort volume was pitched with lager yeast, fermented at 285 K, and consecutively cooled to 273 K, centrifuged and stored at 283 K. A 100 mL volume was taken after 3 days of storage (cold beer sample), and kept in a closed brown-glass bottle at 283 K for 3 h, prior to HPLC analysis of the cold beer sample.

As control experiments to evaluate the addition of alpha-acids and iso-alpha-acids in the free acid form, also brewing experiments using non-modified hop extract and non-modified isomerized hop extract were performed. Volumes of hop extract (containing 4 g of alpha-acids) and isomerized hop extract (containing 4 g of iso-alpha-acids) were added to separate 100 L boiling lager wort volumes (start pH 5.4), prepared from lager malt, corresponding to addition levels of 40 mg/L of alpha-acids or iso-alpha-acids. All subsequent brewing and analytical steps were the same as for the modified (isomerized) hop extracts.

The addition with the hop extract modified with N-methyl-glucamine (40 mg/L alpha-acids) resulted in an iso-alpha-acid concentration of 23.9 mg/L in the cooled wort and an iso-alpha-acid concentration of 17.7 mg/L in the cold beer. This corresponds to alpha-acid utilizations of 59.8% at the cooled wort stage and 44.3% at the cold beer stage.

The addition with the hop extract modified with potassium glycinate (40 mg/L alpha-acids) led to iso-alpha-acid concentrations of 25.7 mg/L in the cooled wort and 19.4 mg/L in the cold beer, which corresponds to alpha-acid utilizations of 64.3% at the cooled wort stage and 48.5% at the cold beer stage.

The addition with the non-modified hop extract (40 mg/L alpha-acids) led to an iso-alpha-acid concentration of 19.1 mg/L in the cooled wort, and of 13.3 mg/L in the cold beer, which corresponds to alpha-acid utilizations of 47.8% at the cooled wort stage and 33.3% at the cold beer stage.

The addition with the isomerized hop extract modified with potassium glycinate (40 mg/L iso-alpha-acids) led to iso-alpha-acid concentrations of 33.1 mg/L in the cooled wort and 23.3 mg/L in the cold beer, which corresponds to iso-alpha-acid utilizations of 82.8% at the cooled wort stage and 58.3% at the cold beer stage.

The addition with the isomerized hop extract modified with L-proline (40 mg/L iso-alpha-acids) led to iso-alpha-acid concentrations of 31.9 mg/L in the cooled wort and 22.7 mg/L in the cold beer, which corresponds to iso-alpha-acid utilizations of 79.7% at the cooled wort stage and 56.7% at the cold beer stage.

The addition with the non-modified isomerized hop extract (40 mg/L iso-alpha-acids) resulted in iso-alpha-acid concentrations of 23.8 mg/L in the cooled wort and 18.4 mg/L in the cold beer. This corresponds to iso-alpha-acid utilizations of 59.5% at the cooled wort stage and 46.0% at the cold beer stage.

Example 10. Preparation of an Aqueous Solution or Mixture Containing Alpha-Acid Complexes from Hop Extract or Hop Pellets Prior to Addition of Alpha-Acid Complexes to the Wort The transformation and brewing experiments in this Example were performed in duplicate. In this Example, the alpha-acid contents of the hop acids containing matters were 50 weight % for the hop extract, and 10 weight % for the hop pellets.

To 1.9 g of potassium glycinate in 100 g $H_2O$ at 318 K was added 8 g of hop extract (containing 4 g of alpha-acids) or 40 g of hop pellets (containing 4 g of alpha-acids) in separate vessels (corresponding to molar ratios of potassium glycinate versus alpha-acid of about 1.5). Next, the vessels were closed, flushed with nitrogen gas, and pressurized with 0.2 MPa nitrogen gas. Then the mixtures were stirred and kept at 318 K for 20 min.

Next, the two obtained aqueous mixtures were entirely added to separate 100 L boiling lager wort volumes (start pH 5.4), prepared from lager malt, which corresponds to alpha-acid additions of 40 mg/L. The wort was boiled for 60 min after the addition of the aqueous mixtures.

After the wort boiling, the wort volume was cooled to 285 K and a 100 mL volume was taken from the cooled wort, and held in a closed brown-glass bottle at 283 K for 3 h, prior to HPLC analysis of the cooled wort sample (with UV detection of the iso-alpha-acids at 256 nm) after sample homogenization.

Thereafter, the cooled wort volume was pitched with lager yeast, fermented at 285 K, and consecutively cooled to 273 K, centrifuged and stored at 283 K. A 100 mL volume was taken after 3 days of storage, and kept in a closed brown-glass bottle at 283 K for 3 h, prior to HPLC analysis of the cold beer sample.

The addition (40 mg/L alpha-acids) of the aqueous mixture prepared from the hop extract led to iso-alpha-acid concentrations of 26.2 mg/L in the cooled wort and 19.7 mg/L in the cold beer, which corresponds to alpha-acid utilizations of 65.5% at the cooled wort stage and 49.3% at the cold beer stage.

The addition (40 mg/L alpha-acids) of the aqueous mixture prepared from the hop pellets resulted in an iso-alpha-acid concentration of 24.7 mg/L in the cooled wort and of 18.9 mg/L in the cold beer. This corresponds to alpha-acid utilizations of 61.8% at the cooled wort stage and 47.3% at the cold beer stage.

Example 11. Preparation of an Aqueous Solution Containing Iso-Alpha-Acid Complexes from Iso-Alpha-Acid Concentrate Prior to Post-Fermentation Addition of Iso-Alpha-Acid Complexes The transformation and brewing experiments in this Example were performed in triplicate for statistical reliability. The iso-alpha-acid content of the hop acids containing matter, in this Example an iso-alpha-acid concentrate, was 95 weight %.

To 10 g of this iso-alpha-acid concentrate (containing 9.5 g of iso-alpha-acids) in about 175 g of water at 318 K in a vessel was added 4.4 g of potassium glycinate (corresponding to a molar ratio of potassium glycinate versus iso-alpha-acid of about 1.5). Next, the vessel was closed, flushed with nitrogen gas, and pressurized with 0.2 MPa nitrogen gas. Then the mixture was stirred and kept at 318 K for 20 min. An aqueous solution with an iso-alpha-acid content of about 5 weight % was obtained.

Next, 2 g and 4 g of this aqueous solution were added to two separate 5 L unhopped filtered lager beer volumes (pH 4.3, at 283 K, gently agitated), which corresponds to iso-alpha-acid additions (of the post-fermentation type) of respectively 20 mg/L and 40 mg/L. A contacting time after the addition of 60 min was applied. Next, a 100 mL volume was taken in both cases, and held in a closed brown-glass vessel at 283 K for 180 min, prior to HPLC analysis.

The 20 mg/L iso-alpha-acid addition to the unhopped lager beer (post-fermentation) resulted in an iso-alpha-acid concentration in the finished beer of 18.7 mg/L, while the addition of 40 mg/L of iso-alpha-acids led to a 35.7 mg/L iso-alpha-acid concentration. This corresponds to iso-alpha-acid utilizations (evaluated at the finished beer stage and for post-fermentation addition of iso-alpha-acids) of respectively 93.5% and 89.3%.

What is claimed is:

1. A method for preparing a brewed beverage, comprising:
adding at least one type of complexes of hop acids, with at least one type of carbon-containing chemical substance(s), with at least one functional group containing a nitrogen atom with a lone electron pair and at least one other polar and/or hydrophilic functional group; wherein said adding is during the brewing process, wherein said adding is to a wort; and wherein said hop acids are selected from the group consisting of alpha-acids, oxidized alpha-acids, beta-acids, and oxidized beta-acids.

2. A method for preparing a brewed beverage, comprising:
   forming at least one type of complexes of hop acids; said complexes of hop acids comprising:
   at least one type of carbon-containing chemical substances;
   at least one functional group containing a nitrogen atom with a lone electron pair and at least one other polar and/or hydrophilic functional group;
   and adding at least one type of complexes of hop acids with at least one type of carbon-containing chemical substances with at least one functional group containing a nitrogen atom with a lone electron pair and at least one other polar and/or hydrophilic functional group during the brewing process;
   wherein said adding is to a wort;
   wherein said hop acids are selected from the group of alpha-acids, oxidized alpha-acids, beta-acids, and oxidized beta-acids.

3. The method according to claim 1, comprising:
   contacting a hop acids containing matter with at least one type of carbon-containing chemical substances having at least one functional group containing a nitrogen atom with a lone electron pair and at least one other polar and/or hydrophilic functional group, thereby forming at least one type of complexes of hop acids with at least one type of carbon-containing chemical substances with at least one functional group containing a nitrogen atom with a lone electron pair and at least one other polar and/or hydrophilic functional group, and with at least a 0.1 weight % hop acid content in the hop acids containing matter or in the (aqueous) medium, mixture or blend wherein the hop acid complex formation occurs.

4. The method according to claim 1,
   wherein the at least one type of complexes of hop acids with at least one type of carbon-containing chemical substances with at least one functional group containing a nitrogen atom with a lone electron pair and at least one other polar and/or hydrophilic functional group are formed by contacting the hop acids containing matter with at least one type of carbon-containing chemical substances with at least one functional group containing a nitrogen atom with a lone electron pair and at least one other polar and/or hydrophilic functional group, prior to addition of the hop acid complexes to an aqueous medium.

5. The method according to claim 1, wherein the at least one type of complexes of hop acids with at least one type of carbon-containing chemical substances with at least one functional group containing a nitrogen atom with a lone electron pair and at least one other polar and/or hydrophilic functional group are formed in an aqueous medium upon contacting the hop acids containing matter with at least one type of carbon-containing chemical substances with at least one functional group containing a nitrogen atom with a lone electron pair and at least one other polar and/or hydrophilic functional group.

6. The method according to claim 1, wherein said hop acids containing matter is selected from the group consisting of hop cones, powdered hops, hop pellets, hop pellets enriched in alpha-acids, hop extracts, alpha-acid enriched hop extracts, hop base extracts, beta-acid extracts, hop extracts containing alpha-acids and beta-acids, hop extracts containing alpha-acids, beta-acids, and hop oils and/or hop hard resins, hop extracts enriched in oxidized hop acids, extracts of purified oxidized hop acids and concentrates containing oxidized hop acids.

7. The method according to claim 1, wherein said carbon-containing chemical substance with at least one functional group containing a nitrogen atom with a lone electron pair and at least one other polar and/or hydrophilic functional group is selected from the group consisting of amino acids, ester substances derived from amino acids, amide substances derived from amino acids, (alkali metal) salt substances derived from amino acids, amino alcohols, amino sugars, amino carbonyls, amides, imides, ureas, amidines, guanidines, their functionalized derivatives, and oligomeric or polymeric derivatives thereof; and wherein these chemical substances are non-cyclic, cyclic or heterocyclic.

8. The method according to claim 1, wherein the molar ratio of at least one type of hop acid to at least one type of carbon-containing chemical substance with at least one functional group containing a nitrogen atom with a lone electron pair and at least one other polar and/or hydrophilic functional group is between 10:1 and 1:20 in the (aqueous) medium, mixture or blend wherein the hop acids and the at least one type of carbon-containing chemical substances with at least one functional group containing a nitrogen atom with a lone electron pair and at least one other polar and/or hydrophilic functional group are contacted and the hop acid complex formation occurs.

9. The method according to claim 1, wherein the hop acids comprise alpha-acids and beta-acids.

10. The method according to claim 1,
    wherein the at least one type of complexes of hop acids as part of a composition selected from the group consisting of hop extracts, concentrates, hop pellets, powders, and solutions.

\* \* \* \* \*